(12) United States Patent
Sakai et al.

(10) Patent No.: US 6,644,729 B2
(45) Date of Patent: Nov. 11, 2003

(54) SUN ROOF APPARATUS

(75) Inventors: Shinji Sakai, Kariya (JP); Kenji Hori, Chiryu (JP); Takashi Okamura, Iwakura (JP)

(73) Assignee: Aisen Seiki Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 10/082,262

(22) Filed: Feb. 26, 2002

(65) Prior Publication Data
US 2002/0117876 A1 Aug. 29, 2002

(30) Foreign Application Priority Data

Feb. 27, 2001 (JP) ........................................ 2001-052999

(51) Int. Cl.[7] .................................................. B60J 7/22
(52) U.S. Cl. ...................................................... 296/217
(58) Field of Search .......................................... 296/217

(56) References Cited

U.S. PATENT DOCUMENTS 3,984,143 A * 10/1976 Vermeulen .................. 296/217
6,082,812 A    7/2000 Lenkens et al. ......... 296/217 X
6,135,544 A * 10/2000 Kohlpaintner et al. ...... 296/217

FOREIGN PATENT DOCUMENTS

GB          2031358     * 4/1980 .................. 296/217

* cited by examiner

Primary Examiner—Dennis H. Pedder
(74) Attorney, Agent, or Firm—Finnegan, Henderson, Farabow, Garrett & Dunner, L.L.P.

(57) ABSTRACT

A vehicle sun roof apparatus includes a deflector movable in a vehicle longitudinal direction in response to an operation of a sliding panel. The deflector is operatively connected to a cam arranged behind an arm portion of the deflector. The cam is movable in the vehicle longitudinal direction in response to a vehicle speed for moving a rear end of the arm portion in a vehicle vertical direction. The vehicle sun roof apparatus further includes a link mechanism freely rotatably fixed at an approximately central portion of the arm portion (14b). The link mechanism is rotatable within a predetermined angle relative to the arm portion and is rotatable relative to the vehicle roof.

7 Claims, 8 Drawing Sheets

SUN ROOF APPARATUS

CROSS REFERENCE TO RELATED APPLICATIONS

This application is based on and claims priority under 35 U.S.C. §119 with respect to a Japanese Patent Application 2001-052999, filed on Feb. 27, 2001, the entire content of which is incorporated herein by reference.

FIELD OF THE INVENTION

This invention generally relates to a sun roof apparatus for opening and closing an opening defined in a vehicle roof by a sliding panel. More particularly, this invention pertains to a sun roof apparatus provided with a deflector of which projecting amount from a vehicle roof can be adjusted. Therefore, the sun roof apparatus prevents wind from being involved into a vehicle interior via an opening defined in the vehicle roof and also decreases wind noise.

BACKGROUND OF THE INVENTION

A type of sun roof apparatus provided with a deflector of which projecting amount from a vehicle roof can be adjusted, have been already known. According to a sun roof apparatus disclosed in a publication of a U.S. Pat. No. 6,082,812, the deflector is provided at a front edge portion of the opening. The deflector is structured to be projected at a high position from the vehicle roof for preventing wind from being involved into a vehicle interior and for preventing wind throb varying a vehicle inner pressure periodically from being generated during the vehicle being running at a middle or low speed. On the other hand, the deflector is adjusted to be projected at a low position from the vehicle roof for decreasing wind noise during the vehicle being running at a high speed. The deflector is provided with a wind deflecting portion extending along the front edge portion of the opening in a vehicle lateral direction and a pair of arm portions extending from both ends of the wind deflecting portion in a vehicle rearward direction.

The above disclosed sun roof apparatus is in a substantially symmetric structure in the vehicle lateral direction relative to a central portion thereof. Therefore, there is an only one side described below unless a particular description is added.

The deflector is operatively connected to a member of the vehicle roof at a rear end of the arm portion by means of a hinge. Further, a pin is provided horizontally between the wind deflecting portion and the hinge connecting portion. A cam member is mounted at a side surface of the arm portion and is operatively connected to the pin. The cam member includes a cam groove extending approximately in a vehicle longitudinal direction so as to generate an inclined portion. A rear end of the cam member is connected to a connecting member extending in the vehicle rearward direction and being connected to a driving mechanism. The cam member is movable relative to the arm portion in the vehicle longitudinal direction. When the sliding panel is under an entirely opened position, the cam member is slidably moved in the vehicle longitudinal direction so as to guide the pin along the cam groove in a vehicle vertical direction. Therefore, a projecting height of the deflector can be adjusted. The movement of the connecting member is controlled by a control device based upon a vehicle speed signal and the like.

According to the above described sun roof apparatus, the cam member is arranged to be operatively connected to the side surface of an intermediate position of the arm portion. The connecting member is arranged at a side of the hinge connecting portion of the rear end of the arm portion relative to the member of the vehicle roof. Therefore, a mechanism potion with the above structure is required to have a large space in the vehicle lateral direction.

Further, it is preferable that the pin is arranged in the vicinity of the wind deflecting portion for firmly supporting the defector against wind pressure and vibration. However, if the pin is arranged in the vicinity of the wind deflecting portion, that is if the pin is away from a hinge point of the rear end of the arm portion, a vertical length of the cam groove is required to be large. A height of a cam member will be then drastically larger than a height of the arm portion positioned horizontally under an inoperative condition.

Generally, a sun roof apparatus is designed to reduce a length of the mechanism portion in the vehicle lateral and vertical directions and to assure a enough length of the opening in the vehicle lateral direction and a large space over an occupant's head. However, according to the above described sun roof apparatus, the length of the opening in the vehicle lateral direction is required to be decreased and the space over the occupant's head is required to be small for providing a function for adjusting the height of the deflector in response to a vehicle speed.

Accordingly, the sun roof apparatus disclosed above is still susceptible of certain improvements with respect to being provided with a mechanism for adjusting the height of the deflector in response to the vehicle speed without decreasing the length of the opening in the vehicle lateral direction and the space over the occupant's head.

SUMMARY OF THE INVENTION

It is an object of the present invention that a vehicle sun roof apparatus provided with a mechanism portion for adjusting a height of a deflector includes an opening of which length in a vehicle lateral direction is assured sufficiently and a sufficient space over an occupant's head.

In order to achieve this objective, there is provided an improved sun roof apparatus for a vehicle which includes an opening defined in a vehicle roof, a sliding panel operated for opening and closing the opening by an operation of an electric motor, a deflector disposed along a front edge portion of the opening and movable in response to an operation of the sliding panel. The deflector includes a wind deflecting portion projected from the vehicle roof during the sliding panel being opened and moved down to an inoperative position during the sliding panel being closed. The deflector further includes an arm portion extending from an edge of the wind deflecting portion in a vehicle rearward direction.

The sun roof apparatus further comprises a control device for adjusting a projecting amount of the wind deflecting portion from the vehicle roof, a cam means disposed behind the arm portion, in which the cam means is slidably movable in a vehicle longitudinal direction for moving a rear portion of the arm portion in a vehicle vertical direction, and a link means mounted on an approximately central portion of the arm so as to be rotatable within a predetermined angle relative to the arm portion.

As described above, the cam means for changing a position of the deflector by the slidable movement of the cam means in the vehicle longitudinal direction is arranged behind the arm portion. Therefore, a length of the mechanism portion of the sun roof apparatus in the vehicle lateral direction is not required to be long. Further, the link means is disposed at the approximately central portion of the arm portion. The link means is tilted down to an inoperative position with the arm portion corresponding to the movement of the arm portion. Each height of the cam means and the link means is structured not to exceed a height of the arm portion when the arm portion is at the inoperative position. Therefore, a length of the mechanism portion of the sun roof apparatus in the vehicle vertical direction is not required to be long.

BRIEF DESCRIPTION OF THE DRAWING FIGURES

The foregoing and additional features and characteristics of the present invention will become more apparent from the following detailed description considered with reference to the accompanying drawing figures wherein.

DETAILED DESCRIPTION OF THE INVENTION

Figure 1:
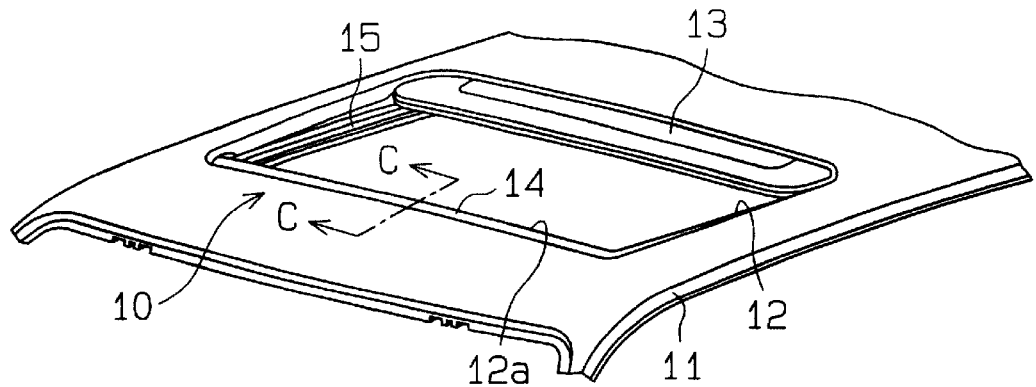
FIG. 1 is a perspective view illustrating a vehicle roof provided with a sun roof apparatus according to the present invention.

As illustrated in FIG. 1, a sun roof apparatus 10 of the present invention is in a substantially symmetric structure in a vehicle lateral direction relative to a central portion thereof. Therefore, there is an only vehicle right side illustrated in FIGS. 3 through 10 unless a particular description is added.

Figure 2:
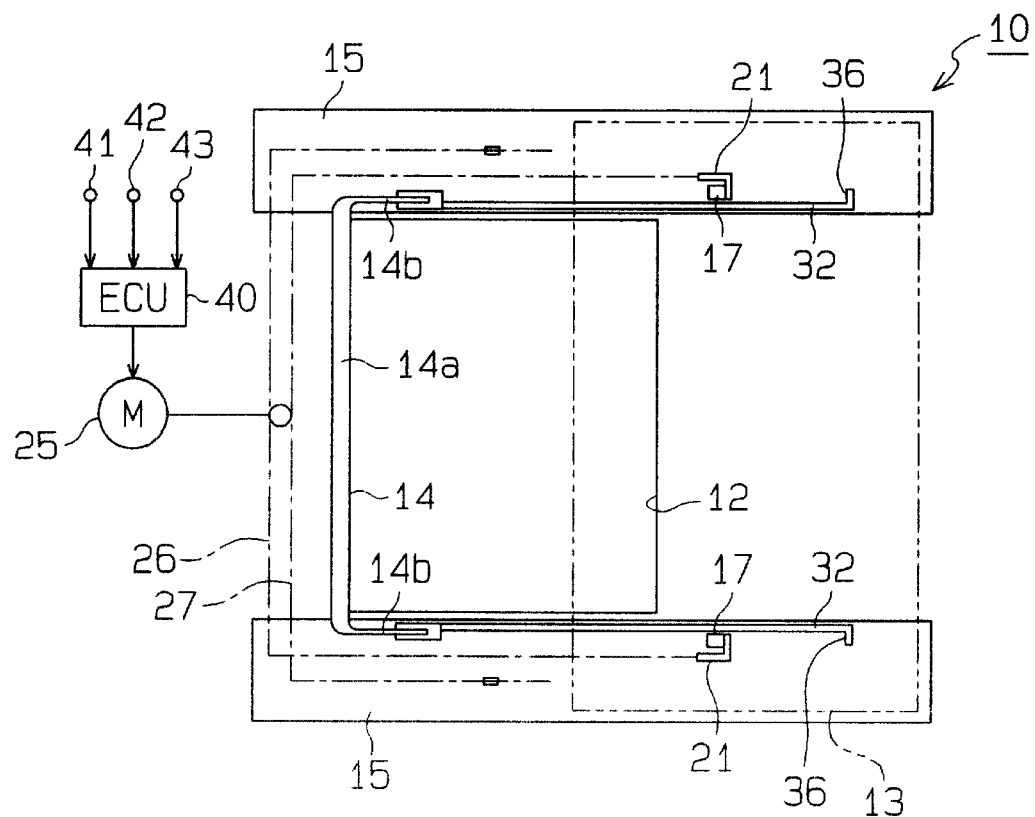
FIG. 2 is a plan bock view schematically illustrating the sun roof apparatus according to the present invention.
Figure 3:
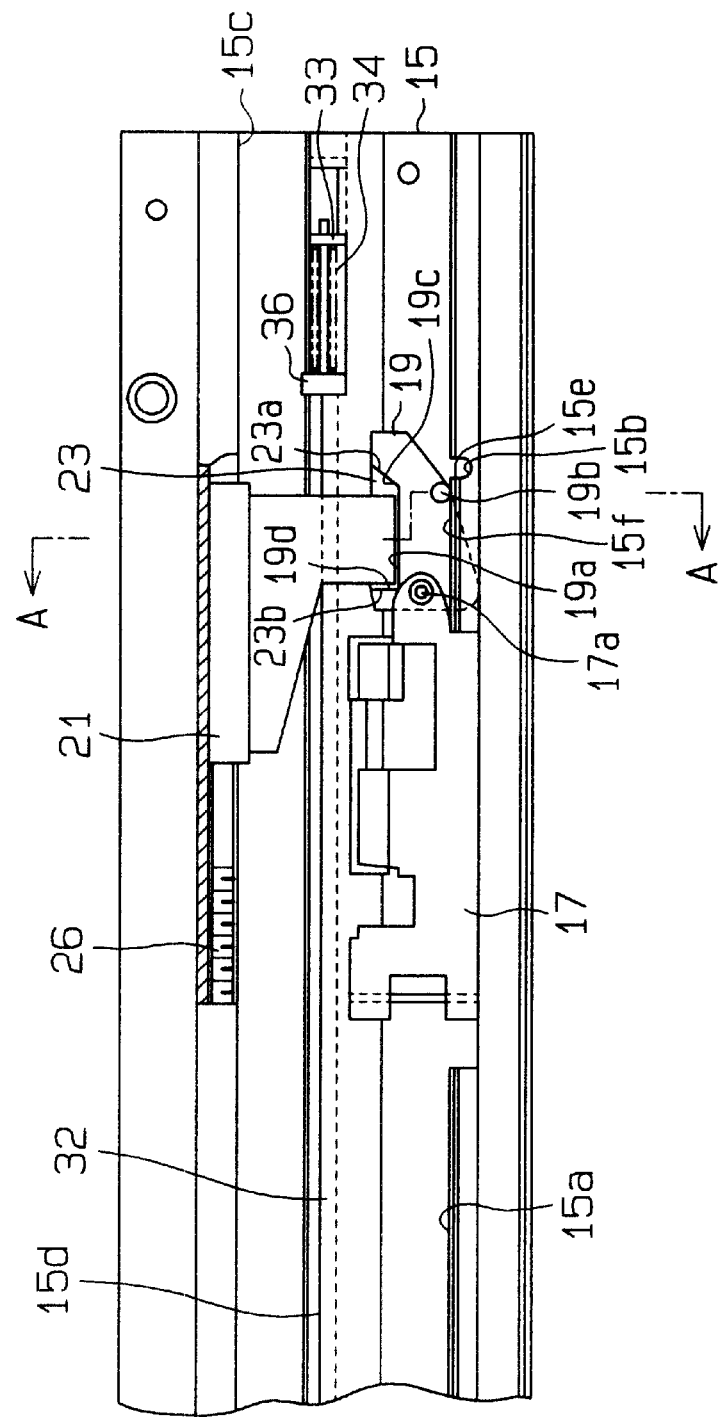
FIG. 3 is an enlarged plan view illustrating a connecting portion of the sun roof apparatus according to the present invention.
Figure 4:
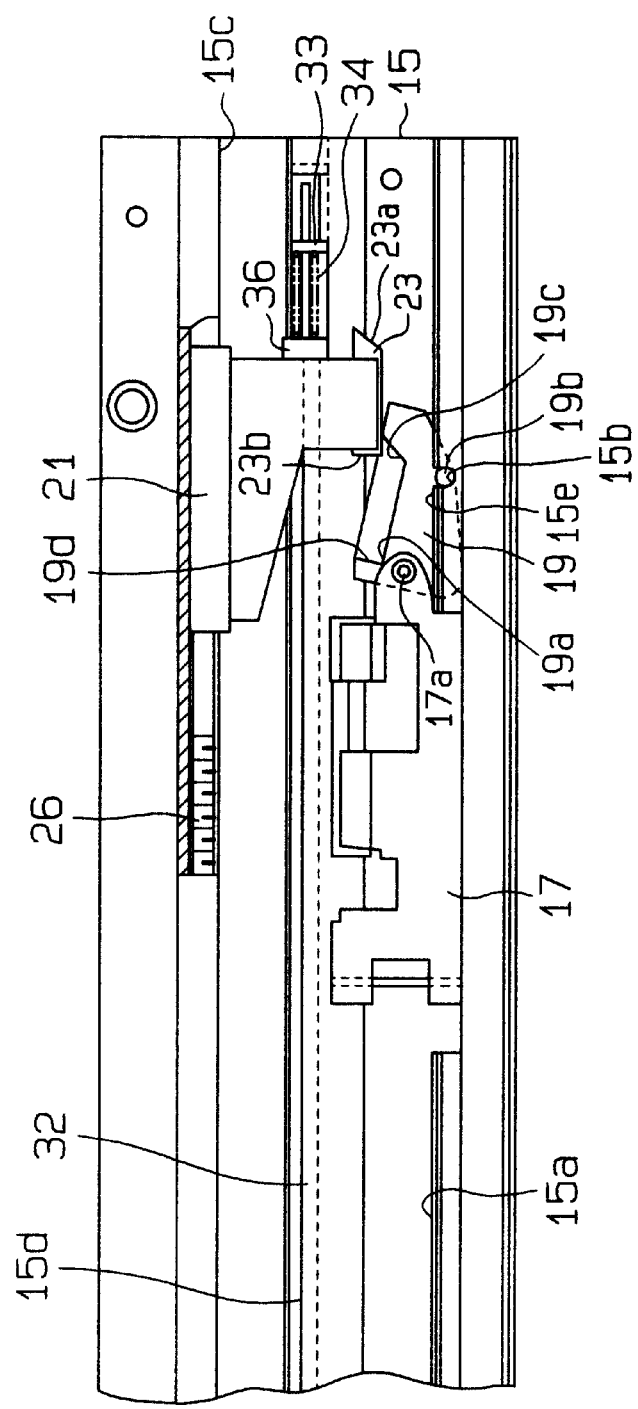
FIG. 4 is an enlarged plan view illustrating the connecting portion of the sun roof apparatus according to the present invention.
Figure 5:
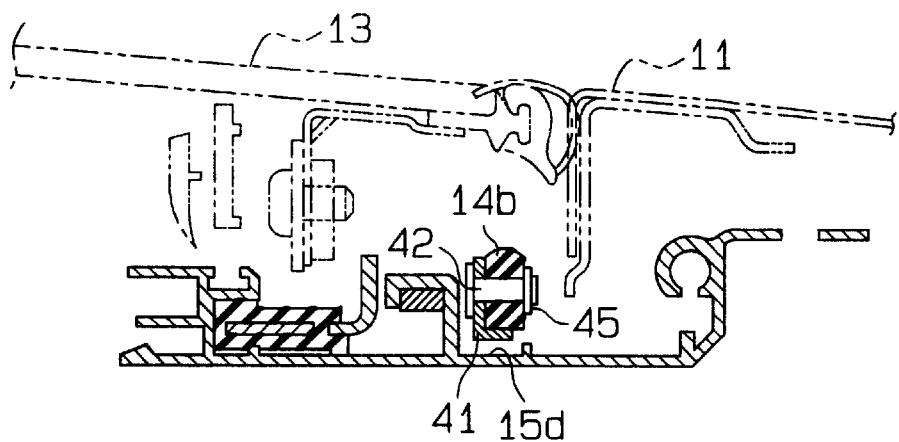
FIG. 5 is a cross-sectional view along a line B—B of FIG. 7.

Referring to FIG. 1, a sun roof apparatus 10 of the present invention is mounted on a vehicle roof 11 and is mainly provided with an opening 12 defined in the vehicle roof 11, a sliding panel 13 movably connected to the opening 12, and a deflector 14 disposed at a front edge portion 12a of the opening 12. The sliding panel 13 is slidably moved in a vehicle longitudinal direction for closing and opening the opening 12. As illustrated in FIG. 2, a pair of shoes 17 is fixed to right and left sides of the sliding panel 13, respectively. A pair of guide rails 15 is fixed to right and left sides of the opening 12. As illustrated in FIGS. 3, 4, the shoe 17 is slidably engaged to the guide rail 15 along a first guiding groove 15a defined in the guide rail 15. Therefore, the sliding panel 13 can be slidably moved in the vehicle longitudinal direction for closing and opening the opening 12. Further, a catch 19 is rotatably fixed to a rear end of the shoe 17 by means of a pin 17a.

Figure 6:
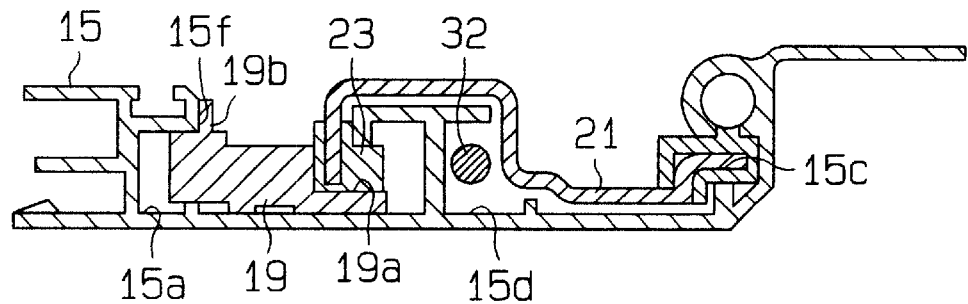
FIG. 6 is a cross-sectional view along a line A—A of FIG. 3.

Referring to FIGS. 3, 4, 6, the catch 19 is provided with an engagement recessed portion 19a and a cylindrical projection 19b. The engagement recessed portion 19a includes an inclined surface 19c and an upright surface 19d. The projection 19b is structured to become in contact with an outer edge portion 15f of the first guiding groove 15a. The outer edge portion 15f is provided with a hole 15b at a predetermined position thereof. The hole 15b with an arc shaped recess has a substantially same radius as a radius of the projection 19b. A front corner portion 15e of the hole 15b is provided with a small chamfer for guiding the projection 19b smoothly into the hole 15b. A position of the hole 15b at the first guiding groove 15a is predetermined for entirely opening the sliding panel 13 fixed to the shoe 17 when the projection 19b is fitted into the hole 15b.

The shoe 17 is further operatively connected to a connecting member 21 via the catch 19. The connecting member 21 is slidably accommodated along a second guiding groove 15c defined in the guide rail 15 and being in parallel with the first guiding groove 15a. A one end of the connecting member 21 is fixed to an engagement member 23. The engagement member 23 including an inclined surface 23a and an upright surface 23b is operatively engageable to the recessed portion 19a of the catch 19. When the connecting member 21 is engaged to the shoe 17 via the catch 19, the inclined surface 23a is structured to become in contact with the inclined surface 19c and the upright surface 23b is also structured to become in contact with the upright surface 19d. Further, as illustrated in FIG. 2, each connecting member 21 is fixed to a one end of each cable 26, 27 operated by a motor driving device 25. Therefore, the connecting member 21 is slidably moved in the second guiding groove 15c in response to an operation of the motor driving device 25. This structure is the same as a structure of a known sun roof apparatus.

Figure 8:
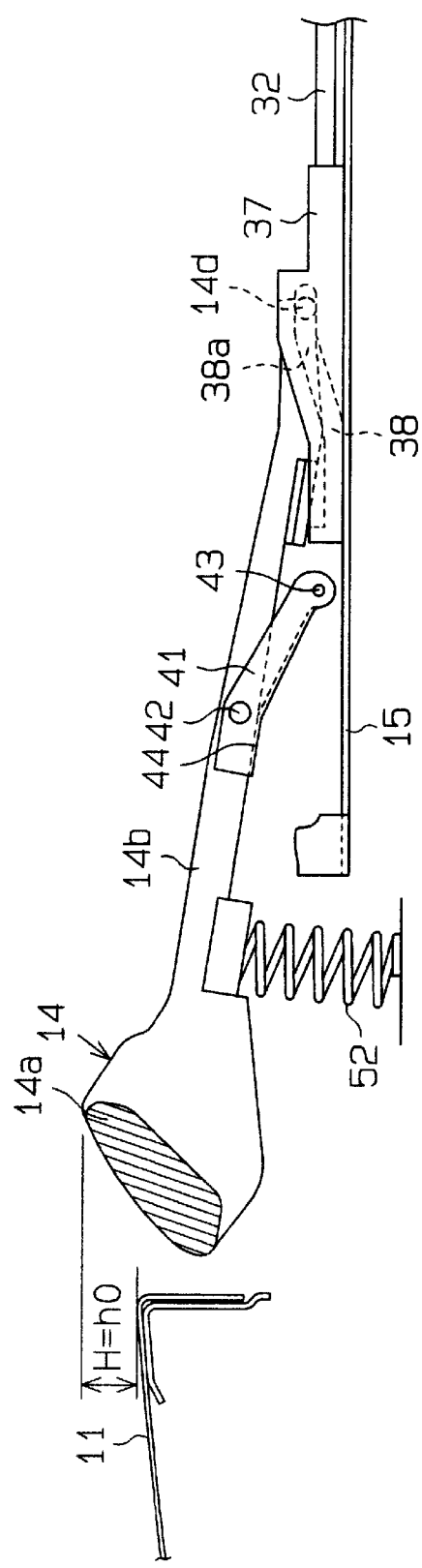
FIG. 8 is a cross-sectional view along the line C—C of FIG. 1 for illustrating a condition of the deflector during the vehicle being running at a high speed with the sliding panel being entirely opened.
Figure 9:
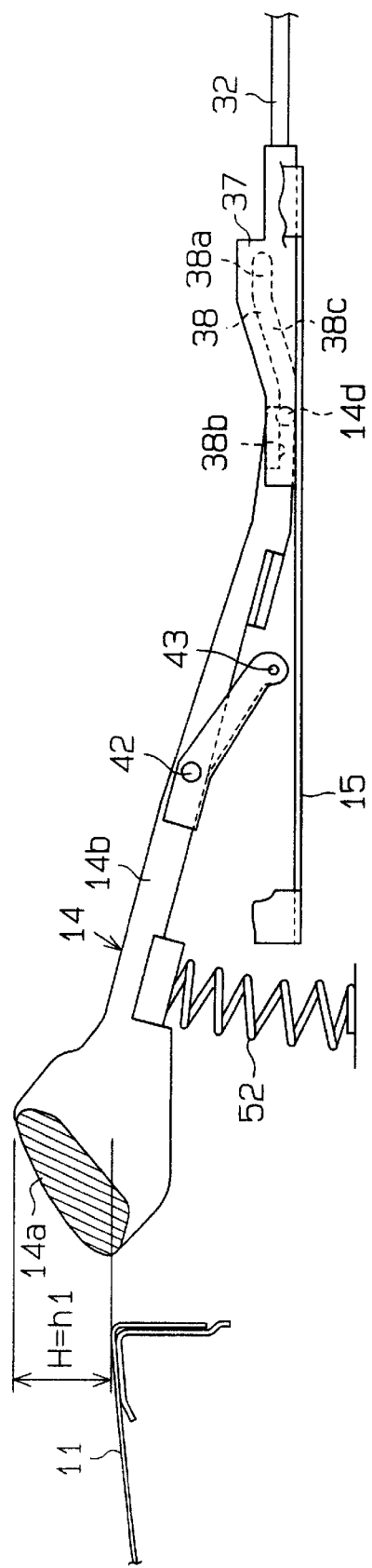
FIG. 9 is a cross-sectional view along the line C—C of FIG. 1 for illustrating a condition of the deflector during the vehicle being running at a low speed with the sliding panel being entirely opened.
Figure 10:
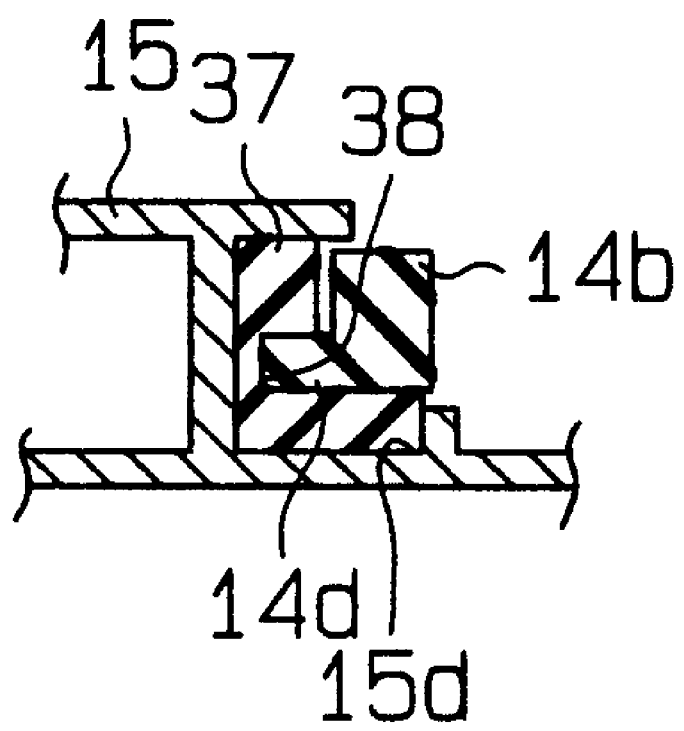
FIG. 10 is a cross-sectional view along a line D—D of FIG. 7.

Referring to FIGS. 1, 2, and 7 through 10, the deflector 14 is formed of a wind deflecting portion 14a extending in the vehicle lateral direction along a front edge portion 12a and a pair of arm portions 14b extending from both ends of the wind deflecting portion 14a in the vehicle rearward direction. As illustrated in FIG. 10 in more detail, a rear end of the arm portion 14b is provided with a guiding pin 14d supported by a cam groove 38 defined in a cam 37 slidably moved in a third guiding groove 15d (described later). The cam 38 groove extends in the vehicle longitudinal direction and is formed of a high position portion 38a, a low position portion 38b, and an inclined portion 38c connecting the high and low position portions 38a and 38b. Each portion 38a, 38b, and 38c has an approximately same sized diameter as a diameter of the guiding pin 14d.

Further, a link member 41 included in a link mechanism is freely rotatably fixed at an approximately central portion of the arm portion 14b by means of an axial pin 42. A rear end of the link mechanism 41 is freely rotatably fixed to the guide rail 15 by means of an axial pin 43. The other end of the link member 41 is provided with a stopper 44 at an opposite side to the axial pin 43 relative to the axial pin 42. The stopper 44 is structured for limiting a rotation of the link member 41 up to a predetermined angle relative to the arm portion 14b. Further, a return spring 52 is disposed between a supporting member 51 supporting the guide rail 15 and a forward end of the arm portion 14b as a connecting portion thereof with the wind deflecting portion 14a. Therefore, the deflector 14 is applied with a biasing force of the return spring 52 in an upper direction with the guiding pin 14d as a rotational center of the deflector 14.

As described above, a position of the deflector 14 is determined by the link member 41, the return spring 52, the guiding pin 14d, and the cam groove 38 defined in the cam 37. That is, a projecting amount of the wind deflecting portion 14a from an upper surface of the roof 11 can be controlled by slidably moving the cam 37 in the third guiding groove 15d in the vehicle longitudinal direction.

More specifically, a rod 32 is connected to a rear end of the cam 37 for moving the cam 37 in the third guiding groove 15d in the vehicle longitudinal direction and for controlling the position of the deflector 14. As illustrated in FIG. 3, the rod 32 extends under the connecting member 21 in the third guiding groove 15d in the vehicle rearward direction. The rod 32 is provided with a contact portion 36 at a rear end thereof. A return spring 34 is disposed between the contact portion 36 and a fixed portion 33 of the guide rail 15 for biasing the rod 32 in the vehicle forward direction. When the connecting member 21 is further moved in the vehicle rearward direction by means of the cables 26, 27, the engagement member 23 is disengaged from the recessed portion 19a of the catch 19 and the only connecting member 21 is moved in the vehicle rearward direction. A rear end surface of the connecting member 21 becomes in contact with the contact portion 36 and moves the rod 32 in the vehicle rearward direction compressing the return spring 34. As described above, the projecting amount of the wind deflecting portion 14a can be effectively adjusted.

FIG. 8 shows the wind deflecting portion 14a located at a low projecting position from the upper surface of the roof 11. FIG. 9 shows the wind deflecting portion 14a located at a high projecting position from the upper surface of the roof 11.

When the wind deflecting portion 14a is located at the low projecting position as illustrated in FIG. 8, the guiding pin 14d of the arm portion 14b is supported by the high position portion 38a of the cam groove 38. The stopper 44 of the link member 41 becomes in contact with a lower surface of the arm portion 14b so as to determine a position of the deflector 14. In this case, the deflector 14 has been maintained at the position by the biasing force of the return spring 52.

When the wind deflecting portion 14a is located at the high projecting position as illustrated in FIG. 9, the guiding pin 14d of the arm portion 14b is supported by the low position portion 38b of the cam groove 38 so as to determine a position of the deflector 14. In this case, the deflector 14 has been maintained at the position by the biasing force of the return spring 52.

Figure 7:
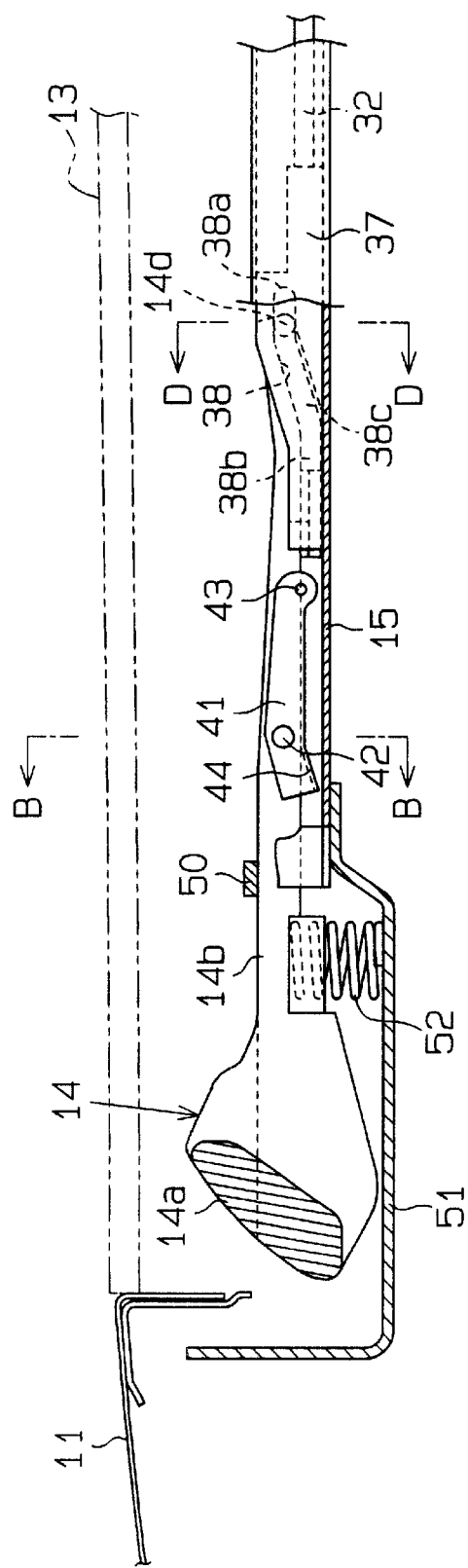
FIG. 7 is a cross-sectional view along a line C—C of FIG. 1 for illustrating a condition of a deflector with a sliding panel being entirely closed.

As illustrated in FIG. 7, the arm portion 14b is lifted down by a contact piece 50 being movable with the sliding panel 13 in the vehicle longitudinal direction when the sliding panel 13 is operated to be entirely closed. The deflector 14 is hence positioned in the opening 12 being covered by the sliding panel 13 against the biasing force of the return spring 52.

Referring to FIG. 2, the sun roof apparatus 10 according to the present invention is further provided with an electronic control device 40 (hereinafter, referred to as a control device 40) for controlling closing and opening operations of the sliding panel 13. The control device 40 is operatively connected to a vehicle speed sensor 41, the motor driving device 25, an operational switch 42, and a rotational speed sensor 43 for detecting a rotational number of the motor driving device 25.

The control device 40 calculates a position of the connecting member 21 based upon a signal from the rotational speed sensor 43. The control device 40 controls the movement of the sliding panel 13 in the vehicle rearward direction for opening the opening 12 or in the vehicle forward direction for closing the opening 12 based upon a signal from the operational switch 42. Further, the control device 40 changes a position of the rod 32 by controlling the position of the connecting member 21 based upon a vehicle speed signal when the sliding panel 13 is under an entirely opened condition. Therefore, the projecting amount of the wind deflecting portion 14a can be adjusted. For example, when the vehicle speed is large, the deflector 14 is positioned as illustrated in FIG. 8 by returning the rod 32 in the vehicle forward direction by the movement of the connecting member 21. On the other hand, when the vehicle speed is small, the deflector 14 is positioned as illustrated in FIG. 9 by pulling the rod 32 in the vehicle rearward direction by the movement of the connecting member 21.

Next, an operation of the sun roof apparatus 10 according to the present invention is described below. Referring to FIGS. 8, 9, the projecting amount of the wind deflecting portion 14a is illustrated by a height H representing the projecting amount of a portion projecting outwardly from an upper edge of the opening 12.

When the sliding panel 13 is operated for opening the opening 12 by a manual operation of the operational switch 42 by an occupant, the cables 26, 27 are driven by the motor driving device 25 and the connecting member 21 is moved in the right direction in FIGS. 3, 4. Therefore, the sliding panel 13 connected integrally with the shoe 17 is moved from the entirely closed position illustrated in FIG. 7 to the entirely opened position illustrated in FIG. 8.

When the sliding panel 13 is moved in the vehicle rearward direction for opening the opening 12, the engagement member 23 generates a pushing force to rotate the catch 19 clockwise in FIG. 3 by the contact of the inclined surface 23a and the inclined surface 19c. The pushing force of the engagement member 23 is received by the outer edge portion 15f being in contact with the projection 19b. When the sliding panel 13 is under the entirely opened condition, the projection 19b is fitted in the hole 15b being assisted by the pushing force of the engagement member 23. The catch 19 is then rotated clockwise as illustrated in FIG. 4.

When the sliding panel 13 is moved from the position for entirely closing the opening 12 as illustrated in FIG. 7 to a direction for opening the opening 12, the contact piece 50 is released from pushing down the upper surface of the arm portion 14b. Therefore, the deflector 14 is lifted up by an elastic force (the biasing force) of the return spring 52 so as to be located at the position illustrated in FIG. 8. In this case, the projecting amount H is set to be at a minimum h0.

When the sliding panel 13 is entirely opened, the control device 40 consequently rotates the electric motor 25 for adjusting the projecting amount H based upon the vehicle speed detected by the vehicle speed sensor 41. The connecting member 21 is then slidably moved for moving the rod 32 in the vehicle rearward direction against the elastic force of the return spring 34. In this case, the engagement of the engagement member 23, the shoe 17, and the connecting member 21 is released so as to maintain the sliding panel 13 under the entirely opened position. When the rod 32 is moved from the position illustrated in FIG. 3 to the position illustrated in FIG. 4 by the movement of the connecting member 21 based upon the vehicle speed, the deflector 14 is lifted up to set the projecting amount H to be at a maximum hi corresponding to the vehicle speed.

Further, when the vehicle speed is increased, the control device 40 controls the connecting member 21 to be moved back in the vehicle forward direction. The rod 32 is then moved in the vehicle forward direction with the connecting member 21 being assisted by the elastic force of the return spring 34. The rod 32 moves the cam 37 in the vehicle forward direction and the guiding pin 14d is engaged at the inclined portion 38c or at the high position portion 38a. Therefore, the projecting amount H of the deflector 14 can be adjusted to be an amount between the maximum amount hi and the minimum amount h0.

When the operational switch 42 is operated for closing the opening 12 by an occupant, the sliding panel 13 is moved in the vehicle forward direction for closing the opening 12. When the sliding panel 13 is almost under the entirely closed position, the arm portion 14b is pushed down by the contact piece 50 and the deflector 14 is lifted down under the sliding panel 13.

As described above, the sun roof apparatus 10 according to the present invention is provided with the cam 37 and the rod 32 for changing the position of the deflector 14. The cam 37 and the rod 32 are arranged behind the arm portion 14b in the vehicle longitudinal direction. Therefore, the mechanism portion of the sun roof apparatus 10 is not required to have a large space in a vehicle lateral direction.

Further, the position of the deflector 14 can be changed only by a small displacement of the guiding pin 14d in a vehicle vertical direction. Therefore, a height of the cam 37 can be structured not to exceed a height of the arm portion 14b in a state where the deflector 14 is under an inoperative condition. The mechanism portion of the sun roof apparatus 10 is hence not required to have a large space in the vehicle vertical direction.

Therefore, the sun roof apparatus 10 provided with a mechanism for adjusting the height of the deflector 14 according to the present invention can be attained without decreasing the length of the opening in the vehicle lateral direction or decreasing a space over a head of the occupant.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. A sun roof apparatus comprising:

an opening defined in a vehicle roof;

a sliding panel operated for opening and closing the opening by an operation of an electric motor;

a deflector disposed along a front edge portion of the opening and movable in response to an operation of the sliding panel;

the deflector including a wind deflecting portion projected from the vehicle roof while the sliding panel is being opened and moved down to an inoperative position while the sliding panel is being closed;

the deflector further including an arm portion extending from an edge of the wind deflecting portion in a vehicle rearward direction;

a control device for adjusting a projecting amount of the wind deflecting portion from the vehicle roof;

a cam means disposed at a rear end portion of the arm portion and operatively connected with the arm portion, being slidably movable in a vehicle longitudinal direction for moving the rear end portion of the arm portion in a vehicle vertical direction; and a link means mounted on an approximately central portion of the arm so as to be rotatable within a predetermined angle relative to the arm portion.

2. A sun roof apparatus, according to claim 1, further comprising:

the arm portion including a pair of arms extending from both edges of the wind deflecting portion in the vehicle rearward direction;

the cam means including a pair of cams disposed behind the pair of arms, being slidably movable in the vehicle longitudinal direction for moving each rear portion of the pair of arms in the vehicle vertical direction; and the link means including a pair of link members freely rotatably fixed at each approximately central portion of the pair of arms, being rotatable within the predetermined angle relative to the pair of arms, and being rotatable relative to the vehicle roof.

3. A sun roof apparatus, according to claim 2, further comprising:

each cam including a cam groove extending in the vehicle longitudinal direction;

the cam groove including a first position portion, a second position portion, and an inclined portion connecting the first position portion and the second position portion for moving each rear portion of each arm in the vehicle vertical direction; and a biasing means for applying a biasing force to each arm in an upper direction, wherein the projecting amount of the wind deflecting portion is adjusted.

4. A sun roof apparatus, according to claim 3, wherein the control device adjusts the projecting amount of the wind deflecting portion from the vehicle roof based upon vehicle driving condition.

5. A sun roof apparatus, according to claim 4, further comprising:

the control device including a detecting means for detecting a vehicle speed, wherein the projecting amount of each arm portion is adjusted to be large when the vehicle speed is low and the projecting amount of each arm portion is adjusted to be small when the vehicle speed is large.

6. A sun roof apparatus, according to claim 5, wherein the biasing means includes a return spring.

7. A sun roof apparatus, according to claim 6, wherein the detecting means includes a vehicle speed sensor.

* * * * *

UNITED STATES PATENT AND TRADEMARK OFFICE
CERTIFICATE OF CORRECTION

PATENT NO.    : 6,644,729 B2
DATED         : November 11, 2003
INVENTOR(S)   : Shinji Sakai et al.

It is certified that error appears in the above-identified patent and that said Letters Patent is hereby corrected as shown below:

<u>Title page,</u>
Item [73], Assignee, please change "Aisen Seiki Kabushiki Kaisha" to -- Aisin Seiki Kabushiki Kaisha --.

Signed and Sealed this

Twentieth Day of April, 2004

JON W. DUDAS
*Acting Director of the United States Patent and Trademark Office*